(12) United States Patent
Ueyama

(10) Patent No.: US 6,392,965 B1
(45) Date of Patent: May 21, 2002

(54) OPTICAL PICKUP DEVICE

(75) Inventor: Tetsuo Ueyama, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/368,762

(22) Filed: Aug. 5, 1999

(30) Foreign Application Priority Data

Aug. 6, 1998 (JP) .......................................... 10-222861

(51) Int. Cl.[7] ................................................. G11B 7/12
(52) U.S. Cl. ............................. 369/44.12; 369/44.23; 369/44.25; 369/112.01
(58) Field of Search .......................... 369/44.11, 44.12, 369/44.23, 44.25, 44.27, 44.41, 44.42, 112.01, 112.03, 120

(56) References Cited

U.S. PATENT DOCUMENTS

| | | | |
|---|---|---|---|
| 5,253,237 A | 10/1993 | Miyake et al. | 369/44.37 |
| 5,881,035 A | 3/1999 | Ueyama | 369/44.23 |
| 6,014,359 A * | 1/2000 | Nagano | 369/44.12 X |

FOREIGN PATENT DOCUMENTS

| | | |
|---|---|---|
| EP | 0 634 742 A1 | 1/1995 |
| EP | 0 777 217 A2 | 6/1997 |
| JP | 6-162531 | 6/1994 |
| KR | 98-36478 | 8/1998 |
| WO | WO98/35346 | 8/1998 |

OTHER PUBLICATIONS

Office Action dated Jun. 25, 2001 issued by the Korean Intellectual Property Office in the Korean patent application No. 1999–32217 corresponding to this application.

* cited by examiner

*Primary Examiner*—Muhammad Edun
(74) *Attorney, Agent, or Firm*—David G. Conlin; William J. Daley, Jr.; Dike, Bronstein, Roberts & Cushman, Intellectual Property Practice Group of Edwards & Angell, LLP

(57) ABSTRACT

An optical pickup device comprises a semiconductor laser, an optical system which converges light projected by the semiconductor laser onto an optical disk and directs reflected light from the optical disk to a photoreceptor element, and a photoreceptor element which detects the reflected light; the photoreceptor element including at least two main photoreceptive domains divided from one another by a dividing line, which receive reflected light corresponding to a focusing error of the light projected onto the optical disk, and at least one auxiliary photoreceptive domain which detects reflected light which exceeds the main photoreceptive domains in a defocused state; in which the auxiliary photoreceptive domain is provided adjacent to an end of said main photoreceptive domains in the direction of the dividing line.

17 Claims, 11 Drawing Sheets

FIG.2(a)
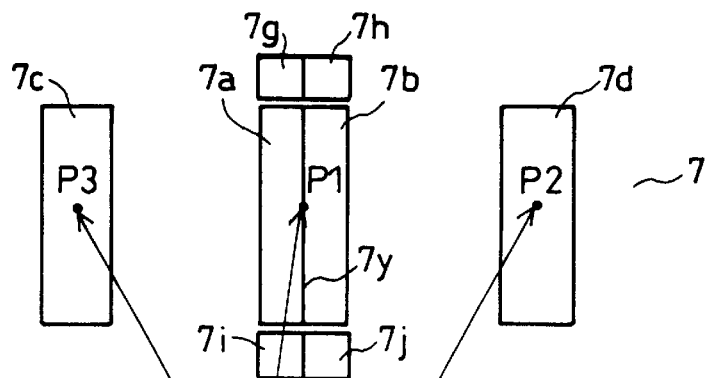
FIG.2(b)
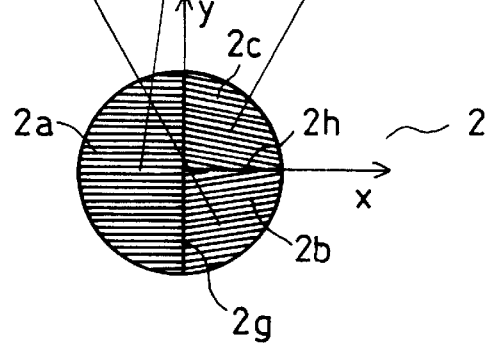
FIG.3(c)  FIG.3(b)  FIG.3(a)  FIG.3(d) FIG.3(e)
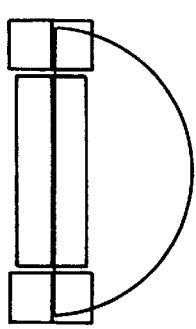 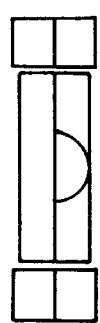 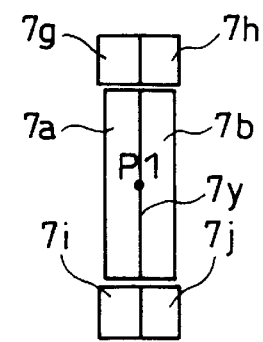  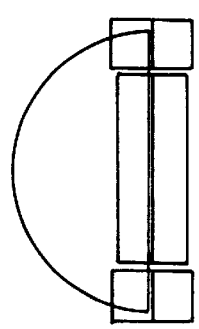
(FAR) ← (FOCUSED STATE) → (CLOSE)

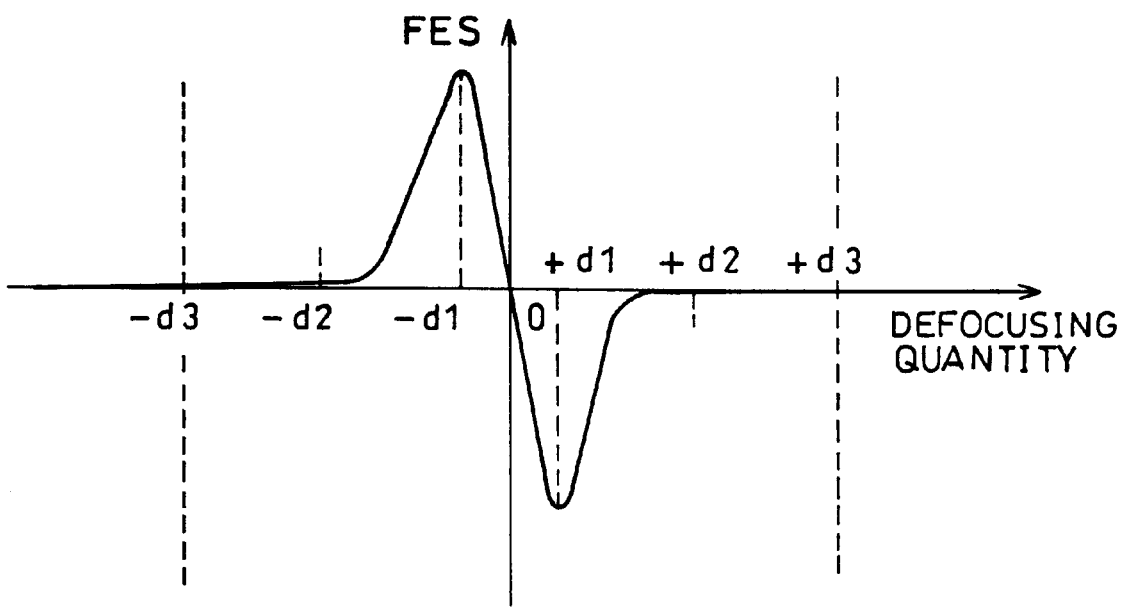

F I G. 8
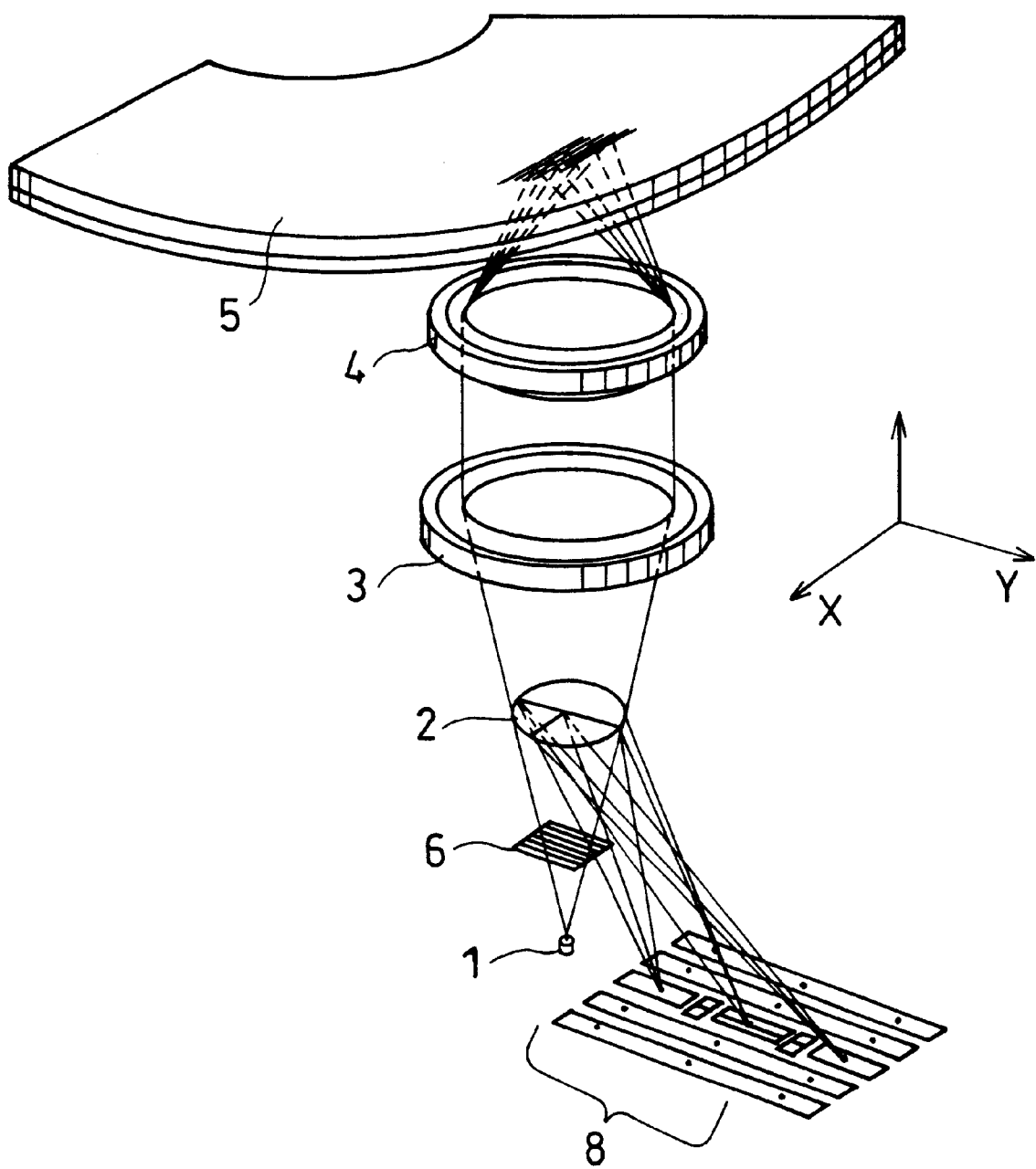

(FAR) ←——— (FOCUSED STATE) ———→ (CLOSE)

FIG. 16
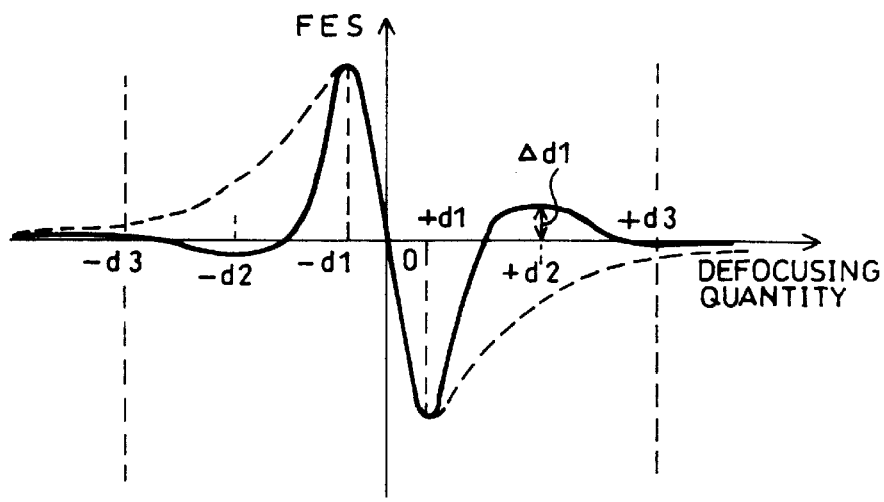
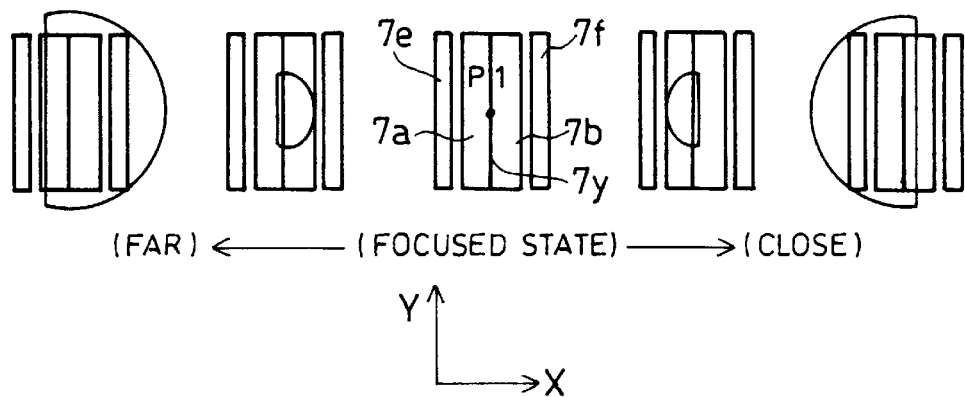
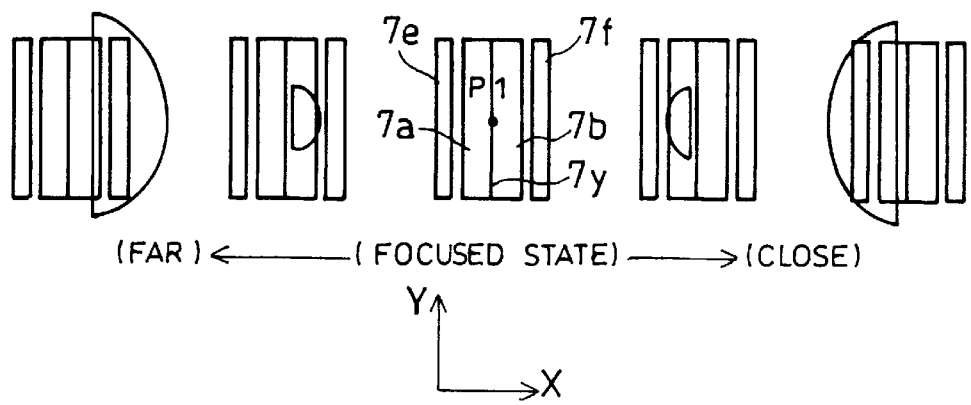

OPTICAL PICKUP DEVICE

FIELD OF THE INVENTION

The present invention relates to an optical pickup device for use in optical disk devices which optically record information in and/or reproduce information from a data recording medium such as an optical disk. Specifically, the present invention relates to an optical pickup device which enables accurate recording and reproducing operations using an optical disk having a plurality of recording and reproducing layers.

BACKGROUND OF THE INVENTION

Since optical disks are capable of recording large quantities of information signals at high density, they are being increasingly used in recent years in fields such as audio, video, computers, etc. Recent innovations include recording media which aim to increase recording capacity by recording signals on a plurality of recording layers, and optical systems which aim to reproduce recorded signals at high speed by simultaneously reading signals from a plurality of tracks using a plurality of light beams.

In the foregoing recording media provided with a plurality of recording layers, if the respective recording and reproducing surfaces are too close together, when the light beam is accessing a given recording and reproducing surface, light reflected from that recording and reproducing surface is influenced by light reflected from adjacent recording and reproducing surfaces. In this case, a focus error signal, for focusing adjustment of the light beam, is also subject to the foregoing influence, and thus accurate focusing adjustment cannot be performed.

In an attempt to provide an optical system able to resolve the foregoing problem, the present Applicant has previously proposed the optical pickup device shown in FIG. 11 (Japanese Unexamined Patent Publication No. 9-161282/1997 (Tokukaihei 9-161282), published on Jun. 20, 1997).

In the optical pickup device shown in FIG. 11, light projected by a semiconductor laser 1 passes through a holographic element 2, a collimating lens 3, and an objective lens 4, and is converged on an optical disk 5. Light reflected therefrom passes through the objective lens 4 and the collimating lens 3, and is directed to the holographic element 2.

As shown in FIG. 12(b), the holographic element 2 is divided into three divisions 2a, 2b, and 2c by a dividing line 2g, running in a y direction corresponding to the radial direction of the optical disk 5, and a dividing line 2h, running from the center of the dividing line 2g in an x direction perpendicular to the radial direction of the optical disk 5, i.e., a direction corresponding to the track direction of the optical disk 5.

As shown in FIG. 12(a), a photoreceptor element 7 includes four rectangular photoreceptive domains 7a, 7b, 7c, and 7d arranged along the x direction corresponding to the track direction of the optical disk 5. The central photoreceptive domains 7a and 7b (photoreceptive domains for focusing) are divided from one another by a dividing line 7y running in the y direction corresponding to the radial direction of the optical disk 5, and auxiliary photoreceptive domains 7e and 7f are provided on the outer sides of the photoreceptive domains 7a and 7b.

The foregoing photoreceptive domains are arranged such that when the light beam is focused on a recording surface of the optical disk 5, reflected light diffracted by the division 2a of the holographic element 2 forms a beam spot P1 on the dividing line 7y, and reflected light diffracted by the divisions 2b and 2c forms beam spots P3 and P2 on the photoreceptive domains 7c and 7d, respectively.

Then, if Sa, Sb, Sc, Sd, Se, and Sf are output signals from the photoreceptive domains 7a, 7b, 7c, 7d, 7e, and 7f, respectively, then a focusing error signal FES is calculated as (Sa+Sf)−(Sb+Se). By this means, an FES curve can be corrected so as to be optimum for a recording medium with a plurality of recording layers.

The following will explain in detail, with reference to FIGS. 13(a) through 13(e), only the photoreceptive domains 7a, 7b, 7c, and 7d and the beam spot P1, which relate to FES. In a focused state, as shown in FIG. 13(a), the beam spot P1, which is reflected light for focusing, is focused on the dividing line 7y. As the optical disk 5 gets farther away, as shown in FIGS. 13(b) and 13(c), the beam spot P1 first spreads into the photoreceptive domain 7b, and is finally incident on the photoreceptive domain 7f as well; as the optical disk 5 gets closer, as shown in FIGS. 13(d) and 13(e), the beam spot P1 first spreads into the photoreceptive domain 7a, and is finally incident on the photoreceptive domain 7e as well.

In FIG. 14, a curve of the focusing error signal FES=(Sa+Sf)−(Sb+Se) is shown as a solid line. Here, outside the pull-in range between −d1 and +d1 where the curve converges with zero, the curve can be brought back to 0 more steeply than the focusing error signal FES when the auxiliary photoreceptive domains 7e and 7f are not provided (=Sa−Sb), shown as a broken line, which returns to 0 more gradually. In this case, when reproducing, for example, a two-layer optical disk 5 in which the distance between the layers is d2, the FES curve will be as shown in FIG. 15, giving two independent FES curves (for the two layers) having a sufficiently small FES offset, and thus enabling normal focus servo to be performed.

However, when assembling the optical pickup, there is naturally some assembly error. If the optical pickup is ideally assembled, it is possible, as above, to reduce offset of the focusing error signal by means of light reflected from adjacent recording and reproducing layers, but in the event of assembly error, this changes the shape of the light reflected to the photoreceptor element when focusing operations are performed, which changes the focus error signal correction quantity and makes it impossible to obtain a good FES curve when reproducing an optical disk having a plurality of recording and reproducing layers.

Accordingly, in order to resolve the foregoing difficulties, the present Applicant proposed an optical pickup which, by optimizing the shape of the auxiliary photoreceptive domains, enables accurate recording and reproducing operations on an optical disk having a plurality of recording and reproducing layers, even if assembly error arises during assembly of the optical pickup (Japanese Unexamined Patent Publication No. 10-222867/1998 (Tokukaihei 10-222867), published on Aug. 21, 1998).

The optical pickup disclosed in Japanese Unexamined Patent Publication No. 10-222867/1998 has the same structure as the optical pickup discussed above, but differs in that the shape of the auxiliary photoreceptive domains is optimized by setting their width in the x direction.

The following will explain disturbance of the FES curve which arises in the conventional optical pickup discussed above (Japanese Unexamined Patent Publication No. 9-161282/1997) due to error in assembly.

In particular, FIG. 16 shows an FES curve when the holographic element 2 shown in FIGS. 11 and 12(b) is misadjusted with an offset in the +x direction with respect to an optical axis determined by the semiconductor laser 1 and the collimating lens 3. In this case, in a greatly defocused state, a large peak is produced when defocusing is in the far direction (at around +d2). In this state, reproducing, for example, a two-layer optical disk in which the distance between the layers is d2 gives rise to an FES offset of Δd1, and a correctly focused state cannot be obtained.

Since FES offset due to incorrect positioning of the holographic element, tolerance of the various members, laser wavelength aberrance, etc. is generally adjusted to 0 by rotation adjustment of the holographic element 2, it does not create a problem in single-layer optical disks, but in a greatly defocused state, the shape of the light beam spot differs from the ideal shape, causing this kind of disturbance of the FES.

The foregoing change in the shape of the light beam spot will now be explained with reference to FIGS. 17(a) through 17(e). If the dividing line 2g of the holographic element 2 is offset in the +x direction, greatly defocused reflected light, as shown in FIGS. 17(c) and 17(e), exceeds the dividing line 7y and extends into the photoreceptive domains 7a and 7b, respectively. When defocusing is in the far direction (FIG. 17(c)), in particular, the reflected light greatly exceeds the dividing line 7y and is incident on the photoreceptive domain 7a, on which it would not be incident in the absence of assembly error. If ΔSa is the amount of increase in the signal Sa from the photoreceptive domain 7a, then the focus error signal FES=(Sa+Sf)−(Sb+Se) is subject to a disturbance calculated as follows:

$$FES = (Sa + Sf) - (Sb + Se)$$
$$= \Delta Sa$$
$$= \Delta d1$$

The following will explain the case of offset of the dividing line 2g of the holographic element 2 in the −x direction. As shown in FIGS. 18(a) through 18(e), greatly defocused reflected light recedes from the dividing line 7y. In the absence of incorrect positioning of the dividing line 2g, the reflected light is incident on the entirety of the photoreceptive domain 7b (as shown in FIG. 13(c)), but in the event of incorrect positioning, as shown in FIG. 18(c), the amount of reflected light incident on the photoreceptive domain 7b is reduced. If ΔSb is the amount of decrease in the signal Sb from the photoreceptive domain 7b, then the focus error signal FES=(Sa+Sf)−(Sb+Se) is subject to a disturbance calculated as follows:

$$FES = (Sa + Sf) - (Sb + Se)$$
$$= \Delta Sb$$
$$= \Delta d1'$$

In order to resolve this problem, Japanese Unexamined Patent Publication No. 10-222867/1998 uses a method which reduces the surface area of each auxiliary photoreceptive domain. Reducing the widths of the auxiliary photoreceptive domains 7e and 7f yields the FES curve shown by a solid line in FIG. 19. Further, in the event of assembly error, an FES curve is as shown by a solid line in FIG. 20. As is evident from a comparison between FIGS. 20 and 16, reducing the widths of the auxiliary photoreceptive domains 7e and 7f can reduce the peak Δd1 when defocusing is in the far direction, which arises due to incorrect positioning of the holographic element 2.

However, when the optical pickup is ideally assembled, since the FES correction quantity in this case is small, the rise in the FES curve is more gradual than in the case of the FES (shown by a dot-and-dash line) obtained with wider auxiliary photoreceptive domains (FIG. 14). Thus, at a defocusing position of +d2, for example, a slight focusing offset of Δd2 arises.

In this way, in the foregoing example, due to the fact that the auxiliary photoreceptive domains for detecting a defocused state were positioned symmetrically with respect to a dividing line formed in the main photoreceptive domain, and on the outer sides of the main photoreceptive domain, a good FES curve could only be obtained either when there was assembly error or when there was no assembly error, but not in both cases.

SUMMARY OF THE INVENTION

It is an object of the present invention to provide an optical pickup device which contributes to improvement of an FES curve of a multi-layer optical disk; in particular, an optical pickup device in which there is no interference among FES curves of the various layers of a multi-layer optical disk having a small distance between recording and reproducing layers, which is able to produce an FES with little disturbance even in cases of assembly error, and which can also be applied to an optical system with a plurality of beams with a small inter-beam interval.

In order to attain the foregoing object, an optical pickup device according to the present invention comprises a light source, an optical system which converges light projected by the light source onto a recording medium and directs reflected light from the recording medium to a photoreceptor element, and a photoreceptor element which detects the reflected light;

the photoreceptor element including at least two main photoreceptive domains divided from one another by a dividing line, which receive reflected light corresponding to a focusing error of the light projected onto the recording medium, and an auxiliary photoreceptive domain which detects reflected light which exceeds the main photoreceptive domains in a defocused state;

in which the auxiliary photoreceptive domain is provided adjacent to an end of said main photoreceptive domains in the direction of the dividing line.

With the foregoing structure, the FES curve in the area outside a pull-in range can be improved, there is no interference among FES curves (no offset) of the various layers of a multi-layer optical disk having a small distance between recording and reproducing layers, and an FES with little disturbance can be produced even in the event of assembly error. Further, the structure according to the present invention can also be applied to an optical system with a plurality of beams with a small inter-beam interval.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 2(a) is an explanatory drawing showing the shape and orientation of a photoreceptor element shown in FIG. 1.

FIG. 2(b) is an explanatory drawing showing the shape and arrangement of a holographic element shown in FIG. 1.

FIGS. 3(a) through 3(e) are explanatory drawings showing the shape of the photoreceptor element shown in FIG. 1, and the state of photoreception when there is no assembly error.

FIG. 7 is a graph showing an FES curve of the optical pickup device shown in FIG. 1 when the holographic element is offset.

FIG. 8 is a drawing schematically showing the structure of the optical system of an optical pickup device according to another embodiment of the present invention.

FIG. 16 is a graph showing an FES curve of a conventional optical pickup device when the holographic element is offset.

FIGS. 17(a) through 17(e) are explanatory drawings showing, in a conventional optical pickup device, the state of photoreception by the photoreceptor element when the holographic element is offset in the +x direction.

FIGS. 18(a) through 18(e) are explanatory drawings showing, in a conventional optical pickup device, the state of photoreception by the photoreceptor element when the holographic element is offset in the −x direction.

DESCRIPTION OF THE EMBODIMENTS

[First Embodiment]

The following will explain one embodiment of the present invention with reference to FIGS. 1 through 7.

Figure 1:
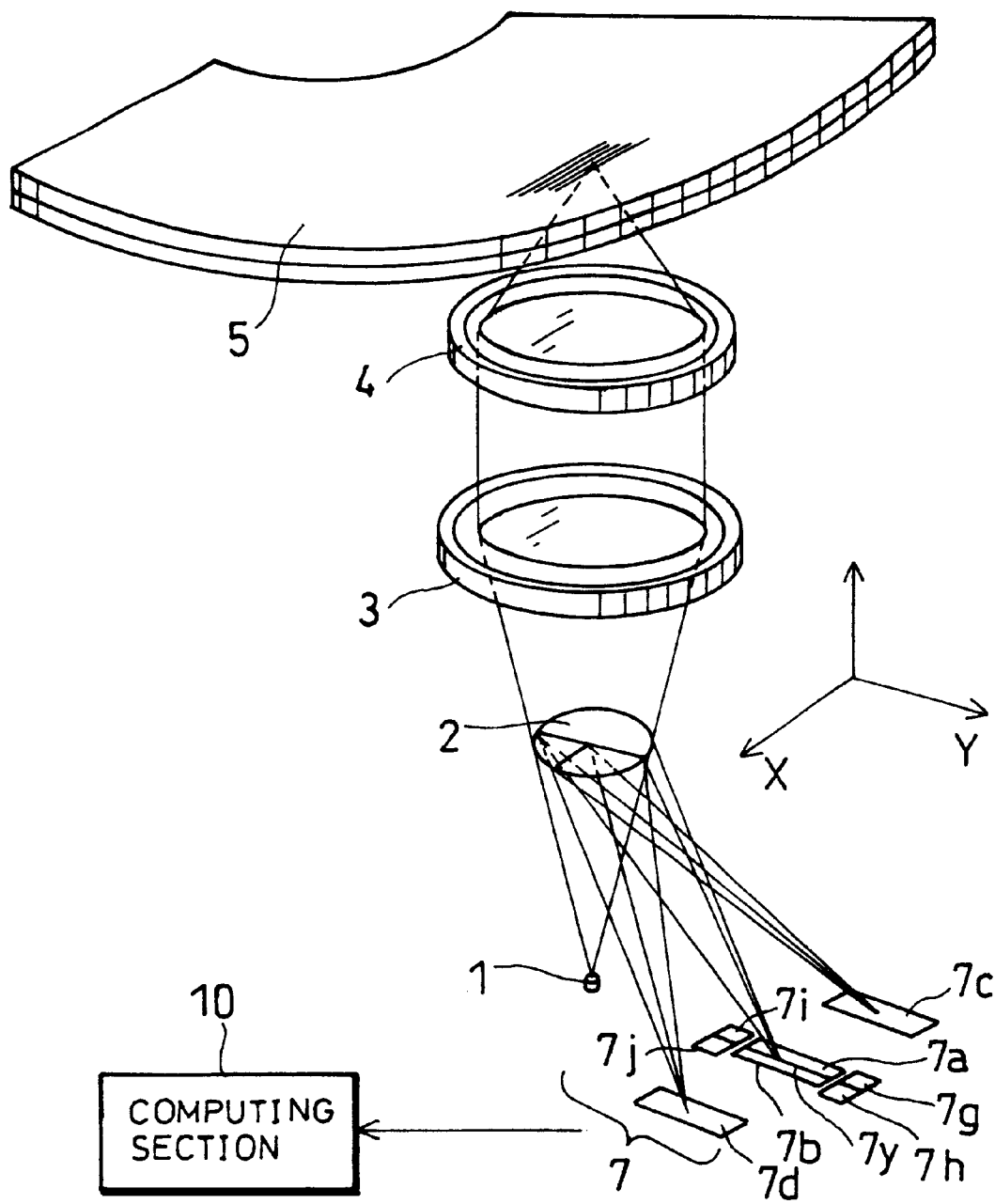
FIG. 1 is a drawing schematically showing the structure of the optical system of an optical pickup device according to one embodiment of the present invention.

As shown in FIG. 1, an optical pickup according to the present embodiment includes a semiconductor laser 1 (light source), a holographic element 2, a collimating lens 3, an objective lens 4, and a photoreceptor element 7. Light projected by the semiconductor laser 1 passes through the holographic element 2, the collimating lens 3, and the objective lens 4, and is converged on an optical disk 5. Light reflected therefrom passes through the objective lens 4 and the collimating lens 3, and is directed to the holographic element 2.

As shown in FIG. 2(b), the holographic element 2 is divided into three divisions 2a, 2b, and 2c by a dividing line 2g, running in a y direction corresponding to the radial direction of the optical disk 5, and a dividing line 2h, running from the center of the dividing line 2g in an x direction perpendicular to the radial direction of the optical disk 5, i.e., a direction corresponding to the track direction of the optical disk 5.

As shown in FIG. 2(a), the photoreceptor element 7 includes four rectangular photoreceptive domains 7a, 7b, 7c, and 7d arranged along the x direction corresponding to the track direction of the optical disk 5. The central photoreceptive domains 7a and 7b (photoreceptive domains for focusing) are divided from one another by a dividing line 7y running in the y direction corresponding to the radial direction of the optical disk 5. Further, auxiliary photoreceptive domains 7g, 7h, 7i, and 7j are provided adjacent to the ends of the photoreceptive domains 7a and 7b in the direction of the dividing line 7y.

The photoreceptive domains 7a, 7b, 7c, and 7d are arranged such that when the light beam is focused on the optical disk 5, reflected light diffracted by the division 2a of the holographic element 2 forms a beam spot P1 (reflected light for focusing) on the dividing line 7y, and reflected light diffracted by the divisions 2b and 2c forms beam spots P3 and P2 (reflected light for tracking) on the photoreceptive domains 7c and 7d, respectively.

Then, if Sa, Sb, Sc, Sd, Sg, Sh, Si, and Sj are output signals from the photoreceptive domains 7a, 7b, 7c, and 7d and the auxiliary photoreceptive domains 7g, 7h, 7i, and 7j, respectively, then a focusing error signal FES is calculated as (Sa+Sh+Sj)−(Sb+Sg+Si) by a calculating section 10 (computing means) shown in FIG. 1.

Figure 12A:
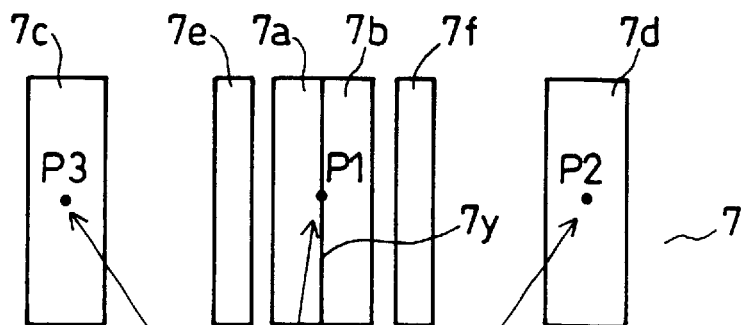
FIG. 12(a) is an explanatory drawing showing the shape and orientation of a holographic element shown in FIG. 11.
Figure 12B:
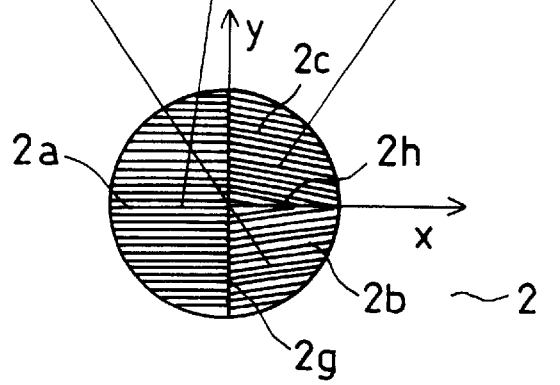
FIG. 12(b) is an explanatory drawing showing the shape and arrangement of a photoreceptor element shown in FIG. 11.
Figures 13A, 13B, 13C, 13D, 13E:
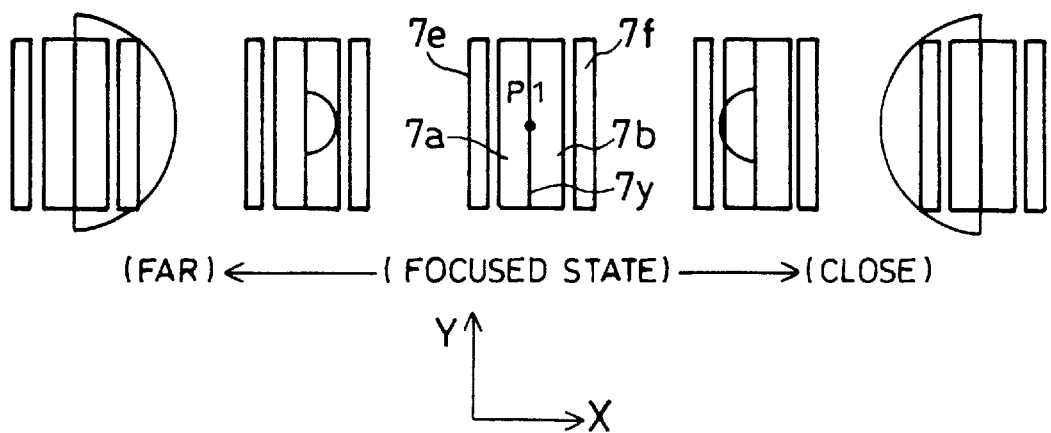
FIGS. 13(a) through 13(e) are explanatory drawings showing the shape of the photoreceptor element shown in FIG. 11, and the state of photoreception when there is no assembly error.
Figure 14:
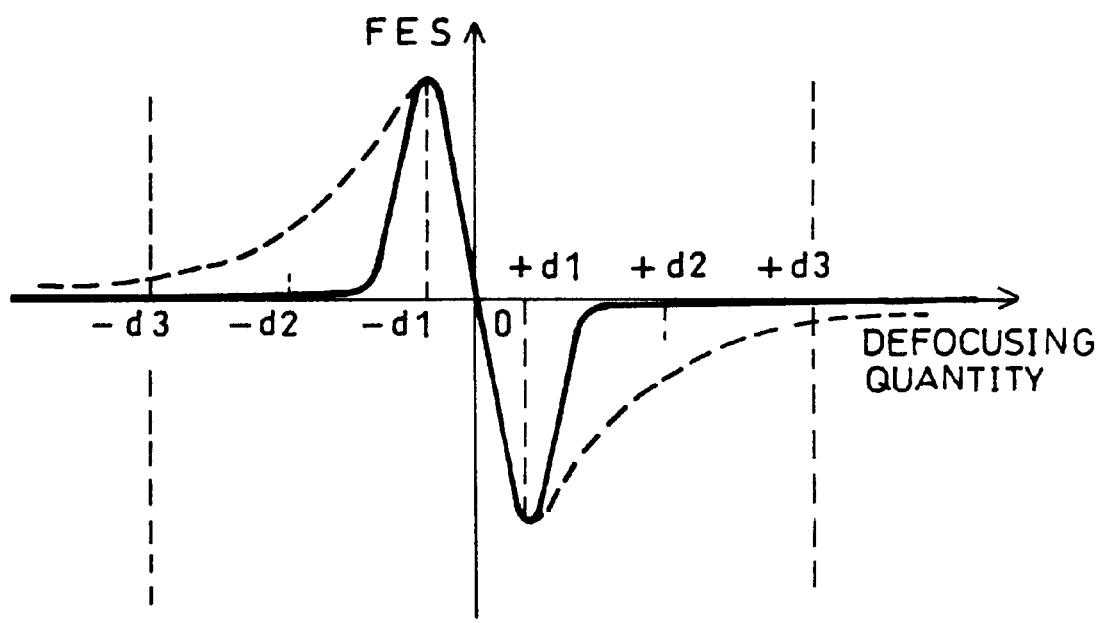
FIG. 14 is a graph showing an FES curve of a conventional optical pickup device.

In the conventional structure discussed above (shown in FIGS. 12(a) and 12(b), the auxiliary photoreceptive domains were provided along a direction perpendicular to the dividing line, but in the structure according to the present embodiment, they are provided along the direction of the dividing line, outside the central photoreceptive domains 7a and 7b for focusing. Using this structure, correction of the FES curve is performed in the same manner as in the conventional example.

The following will explain in detail, with reference to FIGS. 3(a) through 3(e), only the photoreceptive domains 7a and 7b, the auxiliary photoreceptive domains 7g, 7h, 7i, and 7j, and the beam spot P1, which relate to FES.

In a focused state shown in FIG. 3(a), the beam spot P1 is focused as shown FIG. 3(a), and beam spots P2 and P3 (reflected light for tracking) shown in FIG. 2(a) are also focused. As the optical disk 5 gets farther away, as shown in FIGS. 3(b) and 3(c), the beam spot P1 first spreads into the photoreceptive domain 7b, and is finally incident on the photoreceptive domains 7h and 7j as well; as the optical disk 5 gets closer, as shown in FIGS. 3(d) and 3(e), the beam spot P1 first spreads into the photoreceptive domain 7a, and is finally incident on the photoreceptive domains 7g and 7i as well.

Figure 4:
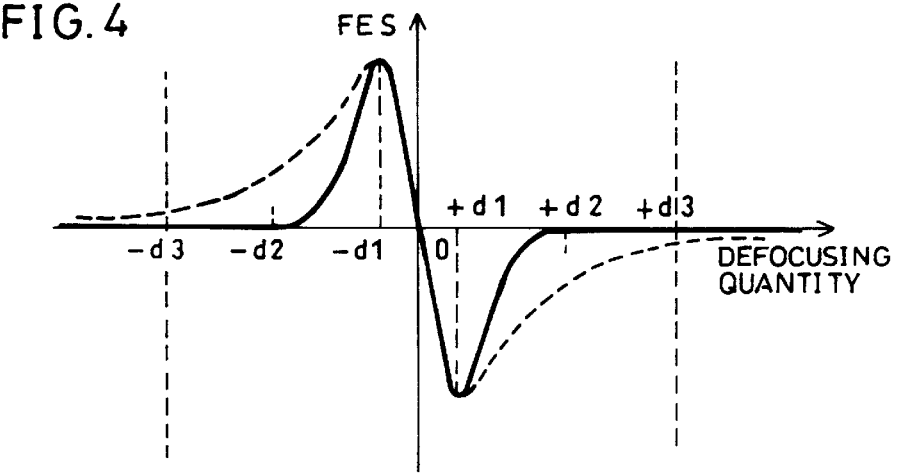
FIG. 4 is a graph showing an FES curve of the optical pickup device shown in FIG. 1.

With the foregoing structure, a curve of the focusing error signal FES=(Sa+Sh+Sj)−(Sb+Sg+Si) is as shown by a solid line in FIG. 4. Further, a curve of an $FES_1$=Sa−Sb is as shown by a dotted line in FIG. 4. As is evident from a comparison of the curves FES and $FES_1$, with the structure according to the present embodiment, the focusing error signal curve can be brought back to 0 more steeply than in the case when the auxiliary photoreceptive domains 7g, 7h, 7i, and 7j are not provided.

Figure 15:
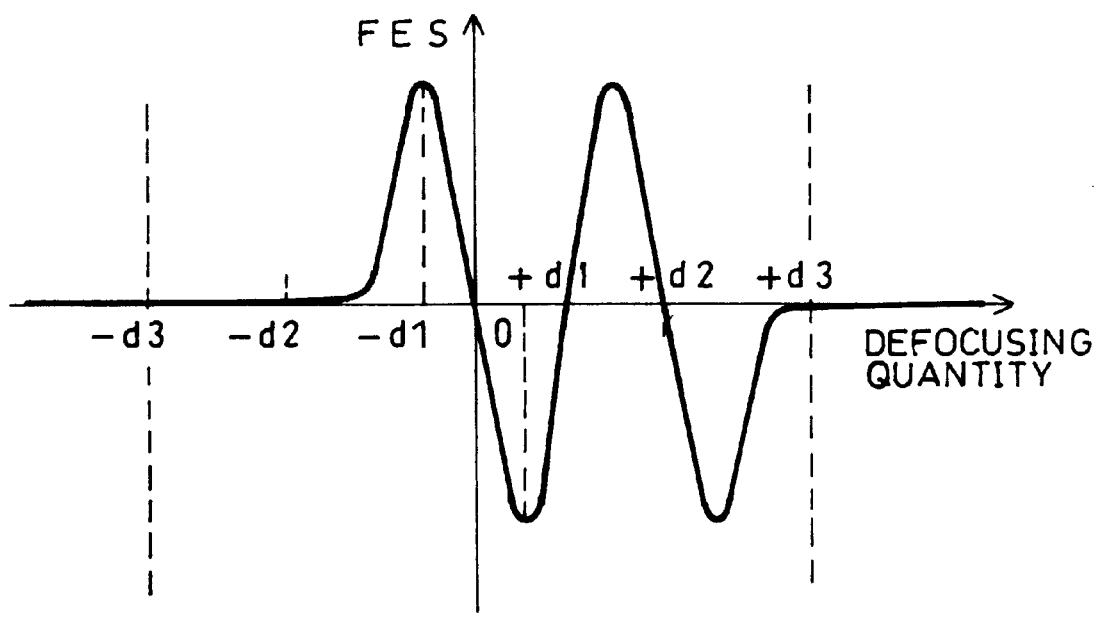
FIG. 15 is a graph showing an FES curve of a conventional optical pickup device when using a two-layer optical disk.
Figure 19:
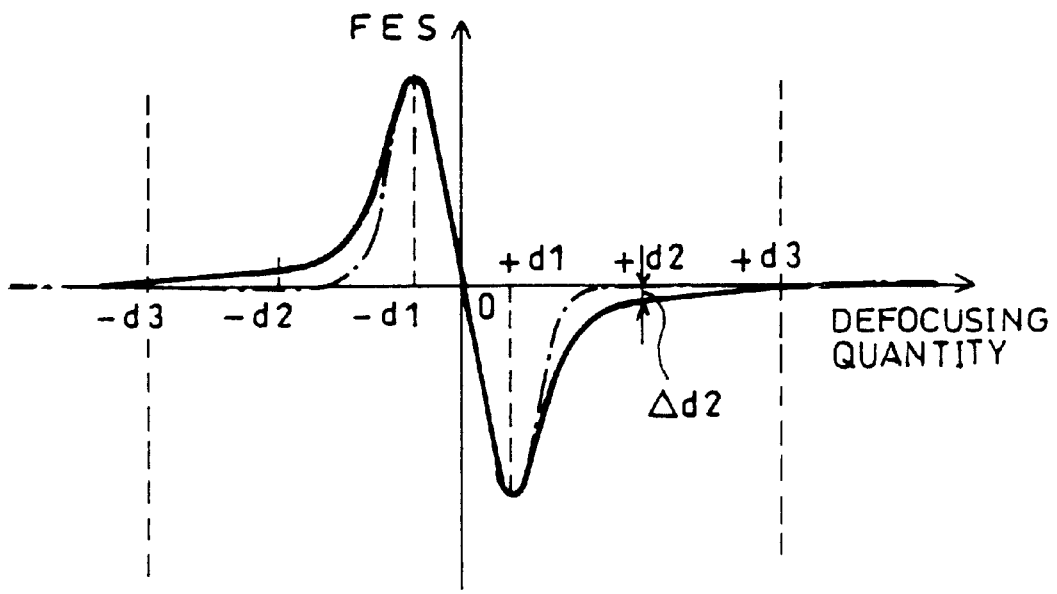
FIG. 19 is a graph showing an FES curve of a conventional optical pickup device.
Figure 20:
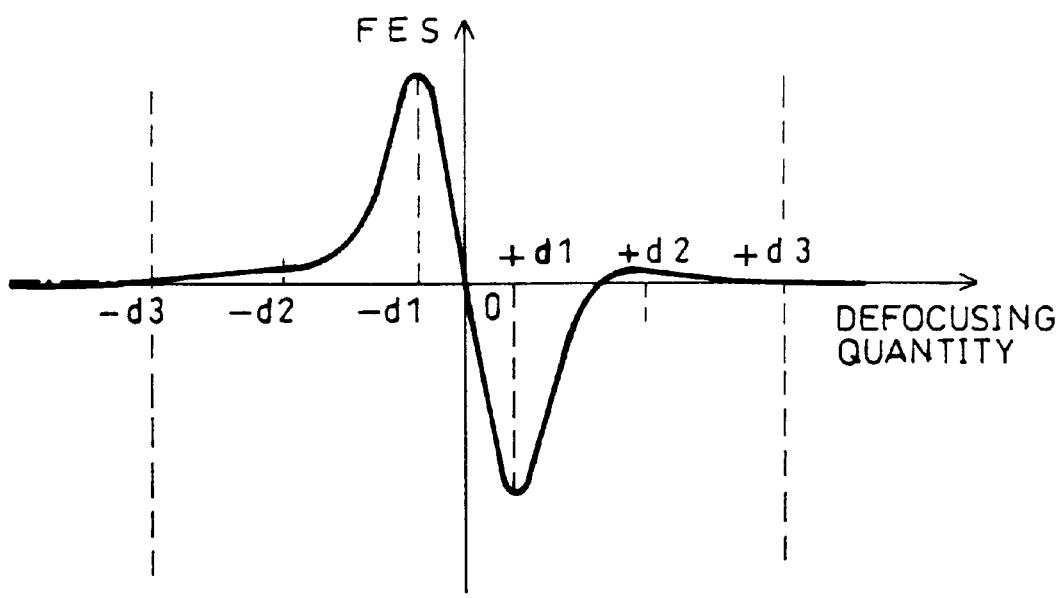
FIG. 20 is a graph showing an FES curve of the foregoing conventional optical pickup device when the holographic element is offset.

With the structure according to the present embodiment, when reproducing, for example, a two-layer optical disk 5 in which the distance between the layers is d2, the FES curve, as in the case of the conventional structure, will be as shown in FIG. 15, giving two independent FES curves (for the two layers) having a sufficiently small FES offset, and thus enabling the performance of a normal focus servo.

In other words, with the structure according to the present embodiment, when reproducing from a given recording and reproducing layer of a multi-layer optical disk, by providing auxiliary photoreceptive domains which receive only reflected light from another recording and reproducing layer, i.e., greatly defocused reflected light, and by optimizing the shape of the auxiliary photoreceptive domains, the FES offset of the target recording and reproducing layer can be corrected using a signal from the auxiliary photoreceptive domains (a signal not from the target recording and reproducing layer).

The foregoing characteristics are the same as in the conventional example, but in the present embodiment, no disturbance arises in the FES even if the holographic element is incorrectly positioned, and normal characteristics can be maintained. This structure will be explained in detail below, with reference to FIGS. 5(a) through 7.

Figures 5A, 5B, 5C, 5D, 5E:
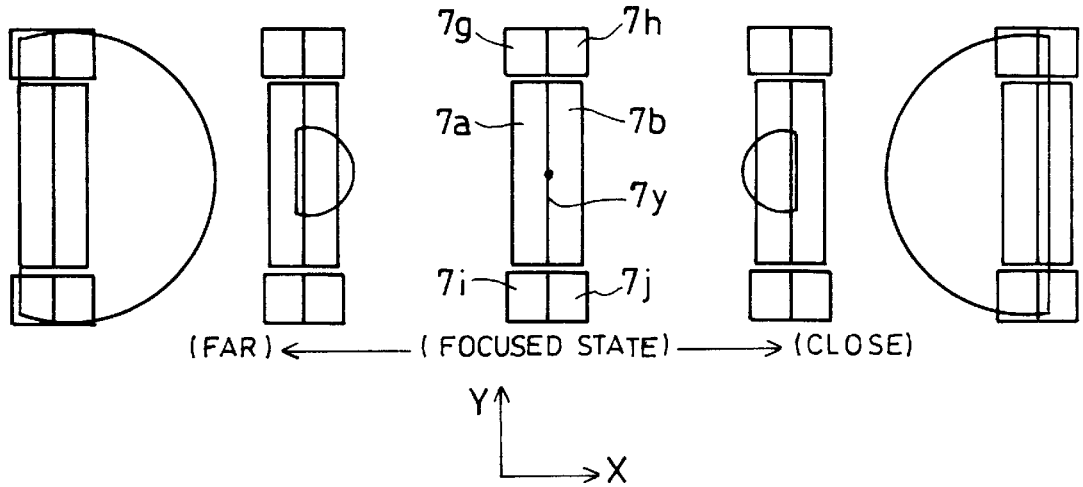
FIGS. 5(a) through 5(e) are explanatory drawings showing, in the optical pickup device shown in FIG. 1, the state of photoreception by the photoreceptor element when the holographic element is offset in the +x direction.

If, as was explained above with reference to FIGS. 17(a) through 17(e), the dividing line 2g of the holographic element 2 is offset in the +x direction, a relationship among the photoreceptive domains 7a and 7b, the auxiliary photoreceptive domains 7g, 7h, 7i, and 7j, and the beam spot P1 is as shown in FIGS. 5(a) through 5(e). Specifically, greatly defocused reflected light, as shown in FIGS. 5(c) and 5(e), exceeds the dividing line 7y. If the dividing line 2g was not incorrectly positioned (as shown, for example, in FIG. 3(c)), the reflected light would not be incident on the photoreceptive region 7a, but due to the incorrect positioning, reflected light is incident on the photoreceptive region 7a (see FIG. 5(c)). However, since the reflected light is also incident on the auxiliary photoreceptive regions 7g and 7i, in the focusing error signal calculated as FES=(Sa+Sh+Sj)−(Sb+Sg+Si), the influence of the reflected light incident on the photoreceptive region 7a is canceled out by that incident on the auxiliary photoreceptive regions 7g and 7i, and there is no great disturbance of the FES, as was the case in FIG. 16.

The following will explain offset of the dividing line 2g of the holographic element 2 in the −x direction. In this case, a relationship among the photoreceptive domains 7a and 7b, the auxiliary photoreceptive domains 7g, 7h, 7i, and 7j, and the beam spot P1 is as shown in FIGS. 6(a) through 6(e).

Figures 6A, 6B, 6C, 6D, 6E:
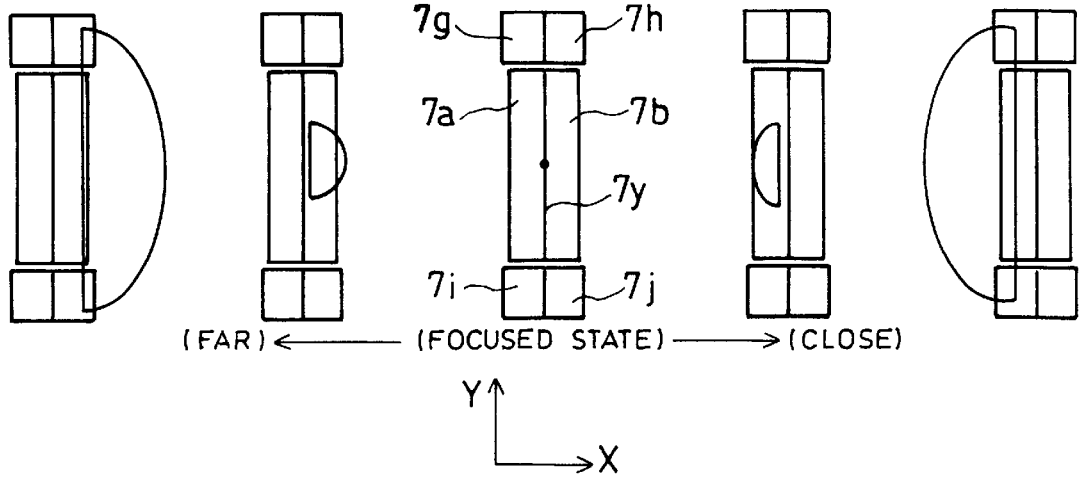
FIGS. 6(a) through 6(e) are explanatory drawings showing, in the optical pickup device shown in FIG. 1, the state of photoreception by the photoreceptor element when the holographic element is offset in the −x direction.

Specifically, greatly defocused reflected light, as shown in FIGS. 6(c) and 6(e), recedes from the dividing line 7y. If the dividing line 2g was not incorrectly positioned (as shown, for example, in FIG. 3(c)), the reflected light would be incident on the entirety of the photoreceptive domain 7b. In the event of incorrect positioning, however, as shown in FIG. 6(c), the amount of reflected light incident on the photoreceptive domain 7b is reduced. However, since the reflected light incident on the auxiliary photoreceptive regions 7h and 7j is also reduced, in the focusing error signal calculated as FES=(Sa+Sh+Sj)−(Sb+Sg+Si), the influence of the reduction of the quantity of light incident on the photoreceptive region 7b is canceled out by the reduction of the quantity of light incident on the auxiliary photoreceptive regions 7h and 7j, and there is no great disturbance of the FES, as was the case in FIG. 16.

Incidentally, the auxiliary photoreceptive regions 7g through 7j are not limited to the arrangement shown in FIG. 2(a); any arrangement is satisfactory provided they have shapes and arrangements which enable them to compensate for (cancel out) fluctuation, caused by assembly error, in the quantity of light received by the main photoreceptive regions.

In the structure according to the present embodiment, the auxiliary photoreceptive domains are provided at both ends of the dividing line of the main photoreceptive domains, but equivalent effects can be obtained even if they are provided only at one end.

Further, in each of the arrangements discussed above, the auxiliary photoreceptive domains 7g through 7j and the main photoreceptive domains 7a and 7b are arranged such that, at a desired defocusing quantity, the FES is reduced to 0. In other words, the shapes (width, length, etc.) and arrangements of the main photoreceptive domains 7a and 7b and the auxiliary photoreceptive domains 7g through 7j are determined so as to enable the auxiliary photoreceptive domains 7g through 7j to correct a focusing error signal from the main photoreceptive domains 7a and 7b. In this way, the FES of each recording and reproducing layer of a multi-layer optical disk can be set in keeping with the interval between recording and reproducing layers, so as not to interfere with each other.

Further, a focusing error signal may also be produced by amplifying (or attenuating) the output of the auxiliary photoreceptive domains 7g through 7j by a set ratio with respect to the output of the main photoreceptive domains 7a and 7b, and then performing the foregoing calculation. In this case, there is more freedom in arranging the auxiliary photoreceptive domains 7g through 7j.

Further, the foregoing explains a case in which a focusing error signal is obtained using the single knife-edge method, but the concept of the present embodiment can also be applied to a case in which a focusing error signal is obtained using the beam size method.

Incidentally, a tracking error signal TES can be calculated using the push-pull method by finding (Sc−Sd). Further, with disks which record a pit signal, a TES can be obtained by the phase difference (DPD) method by comparing a time lag (phase difference) between pit modulation signals of Sc and Sd.

[Second Embodiment]

Figure 9A:
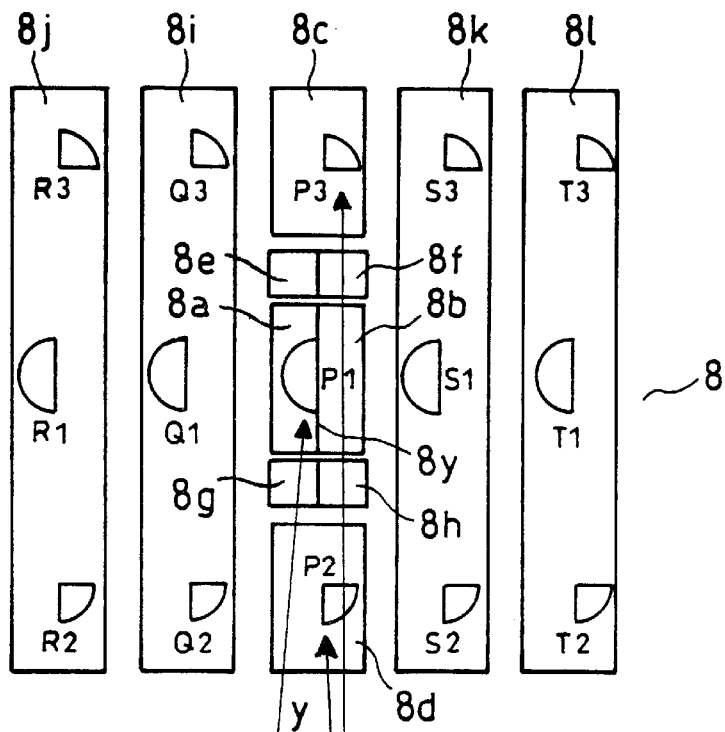
FIG. 9(a) is an explanatory drawing showing the shape and orientation of a photoreceptor element shown in FIG. 8.
Figure 9B:
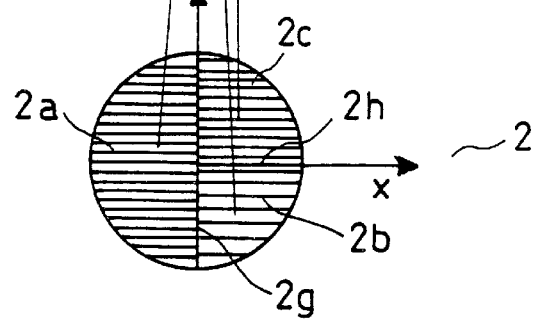
FIG. 9(b) is an explanatory drawing showing the shape and arrangement of a holographic element shown in FIG. 8.

The following will explain another embodiment of the present invention with reference to FIGS. 8 through 9(b).

FIG. 8 is a drawing schematically showing the structure of the optical system of an optical pickup according to the present embodiment. FIG. 9(a) is an explanatory drawing showing the shape and orientation of a photoreceptor element shown in FIG. 8. FIG. 9(b) is an explanatory drawing showing the shape and arrangement of a holographic element shown in FIG. 8.

In the optical pickup according to the present embodiment, a diffraction grating 6 (means for producing a plurality of beams) is provided between the holographic element 2 and the semiconductor laser 1, so as to divide the light projected by the light source into a plurality of beams. The structure of the present optical pickup is otherwise the same as that of the optical pickup according to the first embodiment above.

Figure 10:
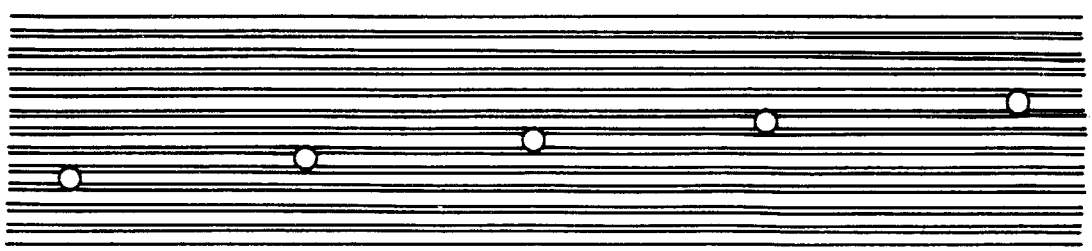
FIG. 10 is an explanatory drawing showing the positions of a plurality of beam spots.
Figure 11:
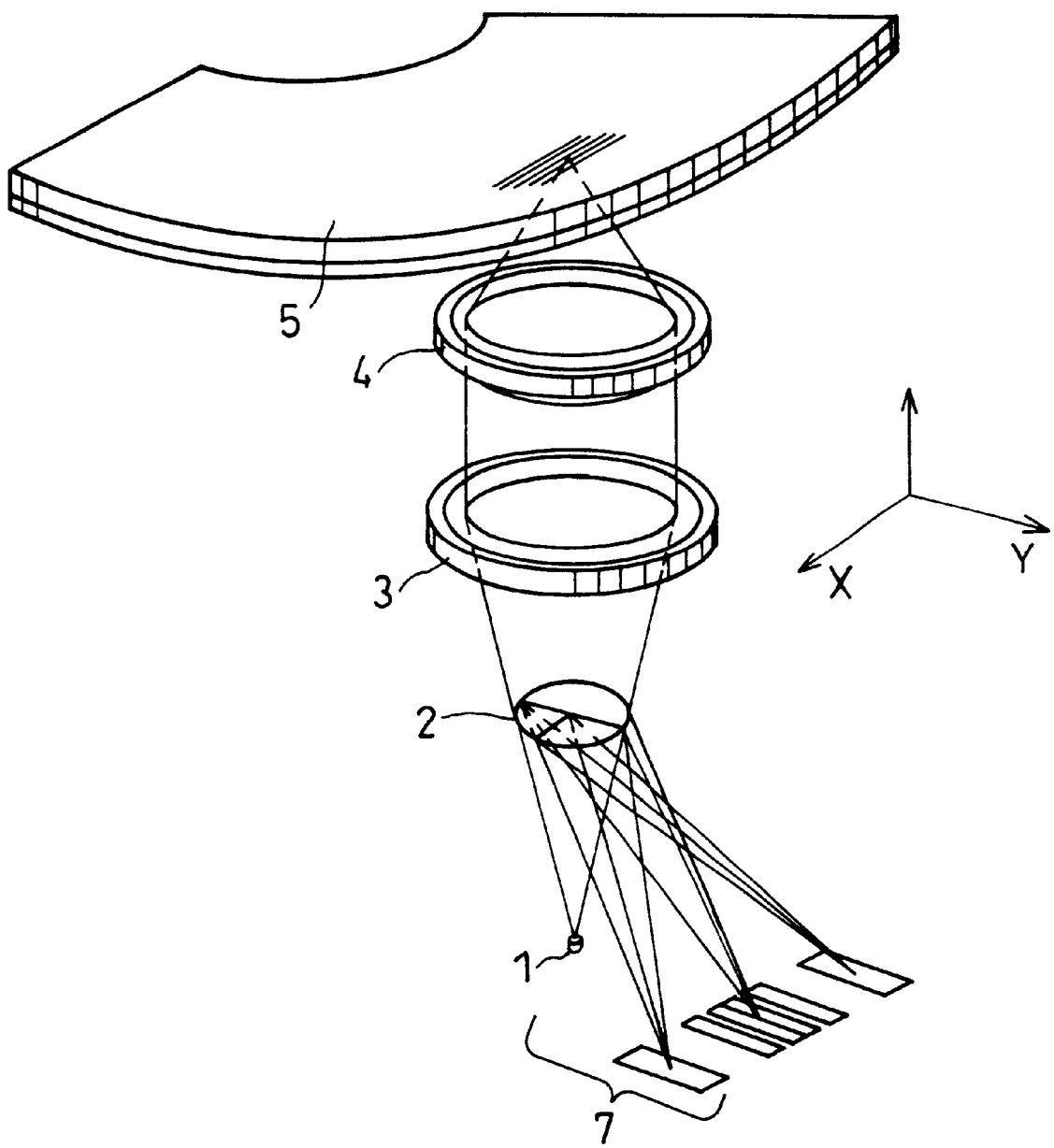
FIG. 11 is a drawing schematically showing the structure of the optical system of a conventional optical pickup device.

Reasons for dividing the light projected by a light source into a plurality of beams include to obtain a TES using the 3-beam method, and to realize high-speed reproducing by simultaneously reading out signals from a plurality of tracks using three or more beams converged on adjacent tracks (FIG. 10). The optical pickup shown in FIG. 8 is structured so as to simultaneously reproduce five tracks by using the diffraction grating to produce five beams: a zero-order beam (main beam) and ±1 and ±2-order beams (sub-beams).

Light reflected from the optical disk 5 is diffracted by the holographic element 2 and directed so as to bypass the diffraction grating 6 and reach a photoreceptor element 8. As shown in FIG. 9(a), the photoreceptor element 8 comprises photoreceptive domains 8a and 8b (photoreceptive domains for focusing), divided from one another by a dividing line 8y running in a y direction corresponding to the radial direction of the optical disk 5, and auxiliary photoreceptive domains 8e, 8f, 8g, and 8h provided adjacent to the ends of the photoreceptive domains 8a and 8b in the direction of the dividing line 8y. Further, on the outer sides of the auxiliary photoreceptive domains 8e, 8f, 8g, and 8h in the y direction are provided photoreceptive domains 8c and 8d (photoreceptive domains for tracking), and along the x direction are provided photoreceptive domains 8i, 8j, 8k, and 8l, which receive the higher-order light beams. With regard to the zero-order diffracted light (main beam), reflected light diffracted by the division 2a of the holographic element 2 forms a beam spot P1 on the dividing line 8y between the central photoreceptive domains 8a and 8b, and reflected light diffracted by the divisions 2c and 2b forms beam spots P3 and P2 on the photoreceptive domains 8c and 8d, respectively.

Further, with regard to the sub-beams, beam spots Q1, S1, R1, and T1, corresponding to +-order, −1 -order, +2 -order, and −2-order light, respectively, of the P1 beam, are incident on the photoreceptive domains 8i, 8k, 8j, and 8l, respectively. (Beam spots Q2, S2, R2, and T2, and Q3, S3, R3, and T3, having the same relations with the P2 and P3 beams, are also incident on the photoreceptive domains 8i, 8k, 8j, and 8l, respectively.) Then, if Sa through Sl are output signals from the photoreceptive domains 8a through 8l, respectively, then a focusing error signal FES is calculated by finding (Sa+Sf+Sh)−(Sb+Se+Sg). In other words, here, the focusing error signal FES is calculated based only on the zero-order diffracted light. TES is calculated as in the first embodiment above. Further, for the reproducing signals of each track, the five signals (Sa+Sb+Sc+Sd+Se+Sf+Sg+Sh), Si, Sj, Sk, and Sl are used.

Since the FES is produced using the auxiliary photoreceptive domains (8e through 8h) arranged as in the first embodiment above, there is no interference among FES curves (no offset) of the various layers of a multi-layer optical disk having a small distance between recording and reproducing layers, and an FES with little disturbance can be produced even in the event of assembly error.

As discussed above, since in the present embodiment, the auxiliary photoreceptive domains are provided only at the outer ends of the dividing line 8y, the effective widths of the auxiliary photoreceptive domains can be reduced (and thus the widths of the main photoreceptive domains 8a and 8b increased) in comparison with the conventional case in which auxiliary photoreceptive domains are provided in the x direction with respect to the main photoreceptive domains. Consequently, it is possible to structure a multi-beam pickup which has normal FES characteristics even when the distance between sub-beams is small.

As discussed above, the present embodiment adopted a diffraction grating as means for producing a plurality of beams, but there is no particular limitation to this; the present embodiment can also be applied to a multi-laser pickup having a plurality of semiconductor laser chips provided in close proximity in the same package, or one which uses a monolithic laser array.

Again, in the present embodiment, among the plurality of beams produced by the diffraction grating 6, the zero-order diffracted light was used to produce the focusing error signal, but it is also possible to use first-order diffracted light for this purpose. Further, it is also possible to adopt a structure in which a focusing error signal is produced and detected for each of the plurality of beams.

Furthermore, the optical pickup according to the present embodiment can be applied not only to multiple beams produced using a diffraction grating, but also to multiple beams from a plurality of semiconductor lasers, multiple beams from a multi-laser having a plurality of emission points, etc. In such a case, it is possible to produce a focusing error signal for only one of the plurality of beams, or to produce a focusing error signal for each of the plurality of beams.

As discussed above, in the present invention, the FES curve in the area outside the pull-in range can be improved, there is no interference among FES curves (no offset) of the various layers of a multi-layer optical disk having a small distance between recording and reproducing layers, and an FES with little disturbance can be produced even in cases of assembly error. Further, the structure according to the present invention can also be applied to an optical system with a plurality of beams with a small inter-beam interval.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations, provided such variations do not depart from the spirit of the present invention or exceed the scope of the patent claims set forth below.

What is claimed is:

1. An optical pickup device comprising:
   a light source;
   an optical system which converges light projected by said light source onto a recording medium and directs reflected light from the recording medium to a photoreceptor element;
   a photoreceptor element which detects the reflected light;
   a diffracting element, which diffracts reflected light from the recording medium and directs it to said photoreceptor element, divided into at least two divisions by a dividing line intersecting substantially at right angles with a diffraction direction;
   said photoreceptor element including at least two main photoreceptive domains divided from one another by a dividing line, which receive reflected light corresponding to a focusing error of the light projected onto the recording medium, and an auxiliary photoreceptive domain which detects reflected light which exceeds said main photoreceptive domains in a defocused state;
   wherein said auxiliary photoreceptive domain is provided adjacent to an end of said main photoreceptive domains in the direction of the dividing line; and wherein a focusing error signal is produced based on diffracted light from at least one of said divisions.

2. The optical pickup device set forth in claim 1, wherein:

said auxiliary photoreceptive domain comprises two or four photoreceptive domains provided in symmetrical positions with respect to the dividing line between said main photoreceptive domains.

3. The optical pickup device set forth in claim 1, wherein:

said auxiliary photoreceptive domain includes a first auxiliary photoreceptive domain on one side of the dividing line, and a second auxiliary photoreceptive domain on the other side of the dividing line;

said optical pickup device further comprising computing means, which produce a focusing error signal by calculating a difference between (a) a signal which is a sum of (i) an output from said main photoreceptive domain on one side of the dividing line and (ii) an output from said second auxiliary photoreceptive domain and (b) a signal which is the sum of (i) an output from said main photoreceptive domain on the other side of the dividing line and (ii) an output from said first auxiliary photoreceptive domain.

4. The optical pickup device set forth in claim 1, wherein:

said light source or said optical system includes means for producing a plurality of beams, which produce a plurality of light beams for simultaneously reproducing a plurality of tracks of the recording medium.

5. The optical pickup device set forth in claim 4, wherein:

said means for producing a plurality of beams are a diffraction grating.

6. The optical pickup device set forth in claim 4, wherein:

said main photoreceptive domains and said auxiliary photoreceptive domain are provided so as to receive only one light beam of the plurality of light beams.

7. An optical pickup device comprising:

a light source;

an optical system which converges light projected by said light source onto a recording medium and directs reflected light from the recording medium to a photoreceptor element;

a photoreceptor element which detects the reflected light;

a diffracting element, which diffracts reflected light from the recording medium and directs it to said photoreceptor element, divided into at least two divisions by a dividing line intersecting substantially at right angles with a diffraction direction;

said photoreceptor element including at least two main photoreceptive domains divided from one another by a dividing line, which receive reflected light corresponding to a focusing error of the light projected onto the recording medium, and an auxiliary photoreceptive domain which detects reflected light which exceeds said main photoreceptive domains in a defocused state;

wherein said auxiliary photoreceptive domain is provided with a shape and in a position which enable compensation for fluctuation, caused by assembly error, in a quantity of light received by said main photoreceptive domains; and wherein a focusing error signal is produced based on diffracted light from at least one of said divisions.

8. The optical pickup device set forth in claim 7, wherein:

said auxiliary photoreceptive domain comprises two or four photoreceptive domains provided in symmetrical positions with respect to the dividing line between said main photoreceptive domains.

9. The optical pickup device set forth in claim 7, wherein:

said auxiliary photoreceptive domain includes a first auxiliary photoreceptive domain on one side of the dividing line, and a second auxiliary photoreceptive domain on the other side of the dividing line;

said optical pickup device further comprising computing means, which produce a focusing error signal by calculating a difference between (a) a signal which is a sum of (i) an output from said main photoreceptive domain on one side of the dividing line and (ii) an output from said second auxiliary photoreceptive domain and (b) a signal which is the sum of (i) an output from said main photoreceptive domain on the other side of the dividing line and (ii) an output from said first auxiliary photoreceptive domain.

10. The optical pickup device set forth in claim 7, wherein:

said light source or said optical system includes means for producing a plurality of beams, which produce a plurality of light beams for simultaneously reproducing a plurality of tracks of the recording medium.

11. The optical pickup device set forth in claim 10, wherein:

said main photoreceptive domains and said auxiliary photoreceptive domain are provided so as to receive only one light beam of the plurality of light beams.

12. An optical pickup device comprising:

a light source;

an optical system which converges light projected by said light source onto a recording medium having a plurality of recording and reproducing layers and directs reflected light from the recording medium to a photoreceptor element;

a photoreceptor element which detects the reflected light;

a diffracting element, which diffracts reflected light from the recording medium and directs it to said photoreceptor element, divided into at least two divisions by a dividing line intersecting substantially at right angles with a diffraction direction;

said photoreceptor element including at least two main photoreceptive domains divided from one another by a dividing line, which receive reflected light corresponding to a focusing error of the light projected onto the recording medium, and an auxiliary photoreceptive domain which, during reproducing of a given said recording and reproducing layer, receives only reflected light from another said recording and reproducing layer, and outputs a correction portion of a focusing error signal;

wherein said auxiliary photoreceptive domain is provided adjacent to an end of said main photoreceptive domains in the direction of the dividing line; and wherein the focusing error signal is produced based on diffracted light from at least one of said divisions.

13. The optical pickup device set forth in claim 12, wherein:

shape and position of said auxiliary photoreceptive domain are set so as to correct an offset caused by incidence of reflected light from another of said recording and reproducing layers onto said main photoreceptive regions.

14. The optical pickup device set forth in claim 12, wherein:

said auxiliary photoreceptive domain comprises two or four photoreceptive domains provided in symmetrical positions with respect to the dividing line between said main photoreceptive domains.

15. The optical pickup device set forth in claim 12, wherein:

said auxiliary photoreceptive domain includes a first auxiliary photoreceptive domain on one side of the dividing line, and a second auxiliary photoreceptive domain on the other side of the dividing line;

said optical pickup device further comprising computing means, which produce a focusing error signal by calculating a difference between (a) a signal which is a sum of (i) an output from said main photoreceptive domain on one side of the dividing line and (ii) an output from said second auxiliary photoreceptive domain and (b) a signal which is the sum of (i) an output from said main photoreceptive domain on the other side of the dividing line and (ii) an output from said first auxiliary photoreceptive domain.

16. The optical pickup device set forth in claim 12, wherein:

said light source or said optical system includes means for producing a plurality of beams, which produce a plurality of light beams for simultaneously reproducing a plurality of tracks of the recording medium.

17. The optical pickup device set forth in claim 16, wherein:

said main photoreceptive domains and said auxiliary photoreceptive domain are provided so as to receive only one light beam of the plurality of light beams.

* * * * *